(12) United States Patent
Atkins

(10) Patent No.: US 11,792,532 B2
(45) Date of Patent: Oct. 17, 2023

(54) PICTURE METADATA FOR HIGH DYNAMIC RANGE VIDEO

(71) Applicant: Dolby Laboratories Licensing Corporation, San Francisco, CA (US)

(72) Inventor: Robin Atkins, Vancouver (CA)

(*) Notice: Subject to any disclaimer, the term of this patent is extended or adjusted under 35 U.S.C. 154(b) by 0 days.

(21) Appl. No.: 18/041,903

(22) PCT Filed: Aug. 5, 2021

(86) PCT No.: PCT/US2021/044580
§ 371 (c)(1),
(2) Date: Feb. 16, 2023

(87) PCT Pub. No.: WO2022/039930
PCT Pub. Date: Feb. 24, 2022

(65) Prior Publication Data
US 2023/0239579 A1    Jul. 27, 2023

Related U.S. Application Data

(60) Provisional application No. 63/066,663, filed on Aug. 17, 2020.

(30) Foreign Application Priority Data
Aug. 17, 2020   (EP) ...................................... 20191269

(51) Int. Cl.
*G06K 9/00*   (2022.01)
*H04N 23/741*   (2023.01)
(Continued)

(52) U.S. Cl.
CPC ............ *H04N 23/741* (2023.01); *G06V 10/60* (2022.01); *G06V 10/758* (2022.01); *G06V 10/761* (2022.01)

(58) Field of Classification Search
None
See application file for complete search history.

(56) References Cited

U.S. PATENT DOCUMENTS 8,330,768 B2 * 12/2012 Mantiuk .............. H04N 1/6027
                                                              345/589
8,760,578 B2   6/2014 Li
(Continued)

FOREIGN PATENT DOCUMENTS

WO    20150073377 W   5/2015
WO    2019050972 W    3/2019
(Continued)

OTHER PUBLICATIONS

"Mastering display color volume metadata supporting high luminance and wide color gamut images," SMPTE ST 2086:2014, The Society of Motion Picture and Television Engineers, 2014.
(Continued)

*Primary Examiner* — Soo Jin Park

(57) ABSTRACT

Methods and systems for generating dynamic picture metadata are presented. Given an input picture generated on a mastering display, characteristics of a target display which is different than the mastering display, and an initial set of dynamic metadata for the input picture, an iterative algorithm: maps the input image to a mapped image for the target display according to a display management process and the image metadata, compares the input image to the mapped image according to a visual appearance-matching metric, and updates the image metadata using an optimization technique until a visibility difference value between the input image and the mapped image according to the visual appearance-matching metric is below a threshold.

15 Claims, 1 Drawing Sheet

(51) Int. Cl.
  *G06V 10/74* (2022.01)
  *G06V 10/75* (2022.01)
  *G06V 10/60* (2022.01)

(56) References Cited

U.S. PATENT DOCUMENTS

| | | |
|---|---|---|
| 8,767,004 B2 | 7/2014 | Longhurst |
| 9,961,237 B2 | 5/2018 | Atkins |
| 9,984,446 B2 | 5/2018 | Ha |
| 10,249,263 B2 | 4/2019 | Hendry |
| 2018/0336669 A1 | 11/2018 | Mertens |
| 2019/0052908 A1 | 2/2019 | Mertens |
| 2019/0304379 A1 | 10/2019 | Pytlarz |
| 2020/0013151 A1 | 1/2020 | Atkins |
| 2020/0193935 A1 | 6/2020 | Van De Kerkhof |

FOREIGN PATENT DOCUMENTS

| | | |
|---|---|---|
| WO | 2020061172 A1 | 3/2020 |
| WO | 2020219341 | 10/2020 |

OTHER PUBLICATIONS

Bovik A.C. et al "Image Quality Assessment: From Error Visibility to Structural Similarity" IEEE Transactions on Image Processing, vol. 13, No. 4, Apr. 1, 2004, pp. 600-612.

R. Mantiuk, et al. "HDR-VDP-2: A calibrated visual metric for visibility and quality predictions in all luminance conditions." ACM Transactions on graphics (TOG) 30.4 (2011): 1-14.

R Rassool, "VMAF reproducibility: Validating a perceptual practical video quality metric." 2017 IEEE international symposium on broadband multimedia systems and broadcasting (BMSB). IEEE, 2017.

S. Lasserre, et al "Single-Layer HDR Video Coding with SDR Backward Compatibility" SPIE Optical Engineering, San Diego, California, Sep. 2016, vol. 9971, pp. 997108-1-13.

Z. Wang, et al. "Image quality assessment: from error visibility to structural similarity," IEEE transactions on image processing vol. 13, No. 4, Apr. 2004, pp. 600-612.

\* cited by examiner

PICTURE METADATA FOR HIGH DYNAMIC RANGE VIDEO

CROSS-REFERENCE TO RELATED APPLICATIONS

This application is a U.S. National Stage of International Application No. PCT/US2021/044580, filed Aug. 5, 2021, which claims priority to U.S. Provisional Application No. 63/066,663, filed Aug. 17, 2020 and European Patent Application No. 20191269.8, filed Aug. 17, 2020, each of which is hereby incorporated by reference in its entirety.

TECHNOLOGY

The present invention relates generally to images. More particularly, an embodiment of the present invention relates to generating dynamic metadata for video sequences and still images.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR. As used herein, the terms visual dynamic range (VDR) or enhanced dynamic range (EDR) may individually or interchangeably relate to the DR that is perceivable within a scene or image by a human visual system (HVS) that includes eye movements, allowing for some light adaptation changes across the scene or image. As used herein, VDR may relate to a DR that spans 5 to 6 orders of magnitude. Thus, while perhaps somewhat narrower in relation to true scene referred HDR, VDR or EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). For example, using gamma luminance coding, images where n ≤8 (e.g., color 24-bit JPEG images) are considered images of standard dynamic range, while images where n ≥10 may be considered images of enhanced dynamic range. HDR images may also be stored and distributed using high-precision (e.g., 16-bit) floating-point formats, such as the OpenEXR file format developed by Industrial Light and Magic.

Most consumer desktop displays currently support luminance of 200 to 300 cd/m² or nits. Most consumer HDTVs range from 300 to 500 nits with new models reaching 1,000 nits (cd/m²). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

As used herein, the term "metadata" relates to any auxiliary information that is transmitted as part of a coded bitstream or sequence and assists a decoder to render a decoded image. Such metadata may include, but are not limited to, color space or gamut information, reference display parameters, and auxiliary signal parameters, as those described herein. Metadata can be characterized as "static" or "dynamic." Examples of static metadata include parameters related to a mastering display, such as the color primaries, white point, and the luminance range of the display used in mastering the video content (Ref. [1]). Examples of dynamic metadata include the minimum, average, and maximum luminance or RGB values of picture frames, trim-pass data, or tone-mapping parameters to be used by a decoder to display the bitstream on a target display (Ref. [2]). To improve existing and future display schemes, as appreciated by the inventors here, improved techniques for generating picture metadata for video sequences, and especially, but not limited, for HDR video, are needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Methods and systems for generating dynamic picture metadata are described. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, to avoid unnecessarily occluding, obscuring, or obfuscating the present invention.

SUMMARY

Example embodiments described herein relate to methods and systems for generating dynamic metadata. A processor receives a sequence of video pictures in a first dynamic range (e.g., HDR or SDR) mastered on a mastering display, and initial dynamic image metadata, wherein the picture metadata comprise syntax parameters for enabling displaying the video pictures on a target display which may be different than the mastering display.

The processor:
a) applies a display mapping process to map an input image to a mapped image in a second dynamic range, wherein the display mapping process takes into account the dynamic image metadata and display characteristics of the target display;
b) compares the input image and the mapped image using an appearance matching metric to generate a visibility difference value; and if the visibility difference value is larger than a threshold, then:
c) applies a metadata optimization method to the dynamic image metadata to reduce the visibility difference value and generate updated image metadata;
d) replaces the dynamic image metadata with the updated image metadata; and returns to step a for another metadata updating iteration until a termination criterion;
else generates an output comprising the input image and the dynamic image metadata.

METADATA FOR HIGH-DYNAMIC RANGE VIDEO

Video coding of signals

Figure 1:
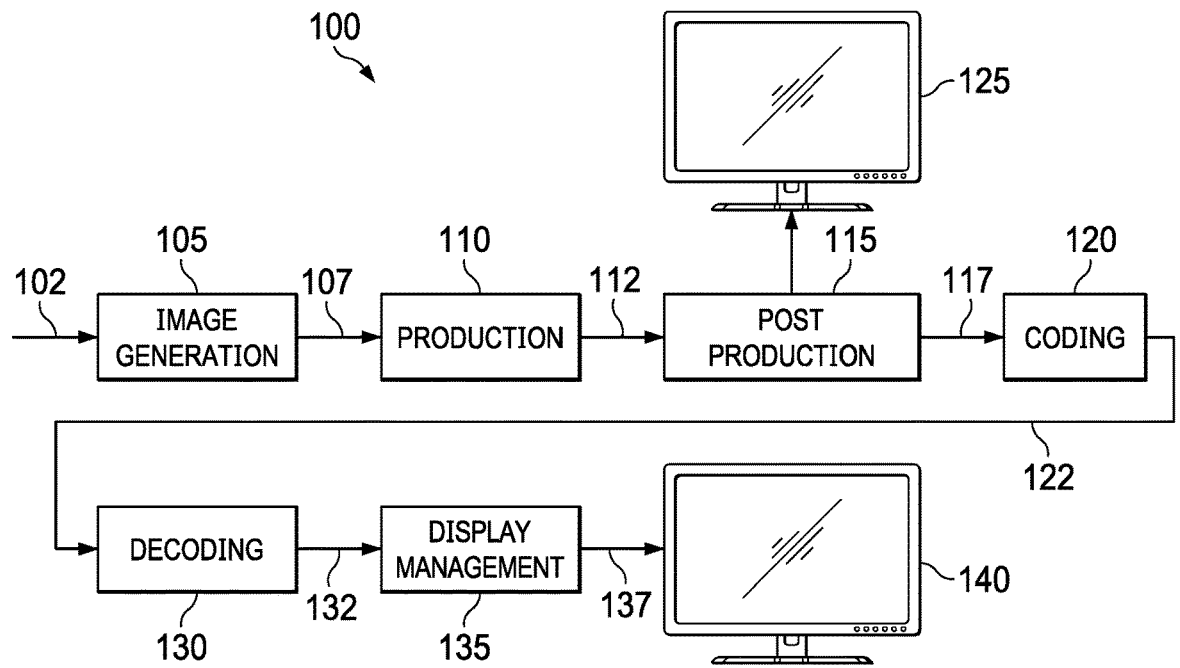
FIG. 1 depicts an example process for a video delivery pipeline.

FIG. 1 depicts an example process of a conventional video delivery pipeline (100) showing various stages from video capture to video content display. A sequence of video frames (102) is captured or generated using an image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." It may also include frame/picture rate resampling. Other editing (e.g. scene selection and sequencing, image cropping, addition of computer-generated visual special effects, variable frame rate sequencing, etc.) may be performed at block (115) to yield a final version (117) of the production for distribution. During post-production editing (115), video images are viewed on a reference or mastering display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range or frame rate of decoded signal (132) to the characteristics of the target display (140) by generating display-mapped signal (137).

Given the ecosystem 100, picture metadata is included to guide the signal processing at the various stages of the image processing pipeline, and particularly the display management process (135). For example, as described in Ref. [2], without limitation, using the terminology of the Dolby Vision high-dynamic range pipeline, picture metadata may include one or more of the following parameters.

L1 metadata, which may include quantities like min, mid, and max representing, respectively, minimum ("crush"), mid-tone ("mid"), and maximum ("clip") luminance or RGB values representative of one or more scenes of source video data 122.

L2 metadata, which provides and/or describes information about video characteristic adjustments that are originated from a director, a color grader, a video professional, etc., in a production studio with reference display 125 with a reference dynamic range.

L3 metadata, which provides and/or describes information about video characteristic adjustments that are originated from a director, a color grader, a video professional, etc., in a production studio with a second reference display, such as target display 140, with a second reference dynamic range different from the reference dynamic range of reference display 125. L3 metadata may include, for example, offsets or adjustments from L1 metadata, such as $\Delta$min, $\Delta$mid, and $\Delta$max which are offsets from the (L1) quantities min, mid, and max, respectively.

L4 metadata, which provides or describes information about global dimming operations. L4 metadata may be calculated by an encoder during pre-processing, and may be calculated using RGB color primaries. In one example, the L4 metadata may include data which dictates a global backlight brightness level of a display panel on a per-frame basis.

Other generated metadata, such as L11 metadata, may provide or describe information to be used to identify the source of the video data, such as cinematic content, computer game content, sports content, and the like. Such metadata may further provide or describe intended picture settings, such as intended white point, sharpness, and the like.

Typically, such metadata is generated in a variety of ways, including:
a. Manually, specifying pre-set values according to the content (e.g., "game" in L11)
b. Automatically, by analyzing the input video frame by frame and computing the metadata based on statistics of the brightness and color of the images (e.g., the L1 min, mid, max values)
c. Semi-manually or semi-automatically, for example, by adjusting metadata values (e.g., "trim pass" L2 metadata) while observing the results on one or more monitors When content 132 is received by a decoder, given a target display 140, the content is processed by a display management process 135, which adjusts the image characteristics as specified by the incoming metadata, for optimized rendering on the target display. Examples of display management processes can be found in Ref. [3-5] and may include a variety of image processing operations, including:

Pre- and post-processing color transformations (e.g., YCbCr or RGB to ICtCp)

Image scaling

Tone-mapping

Saturation control

Color-volume mapping

Trim-pass control; and

Ambient light adjustments

Example embodiments improve the generation of dynamic picture metadata to improve upon the display rendering process. Embodiments described herein apply mostly to automated methods to generate metadata, but can also be applicable to semi-manual or semi-automatic methods, for example, to adjust trim-pass metadata.

Figure 2:
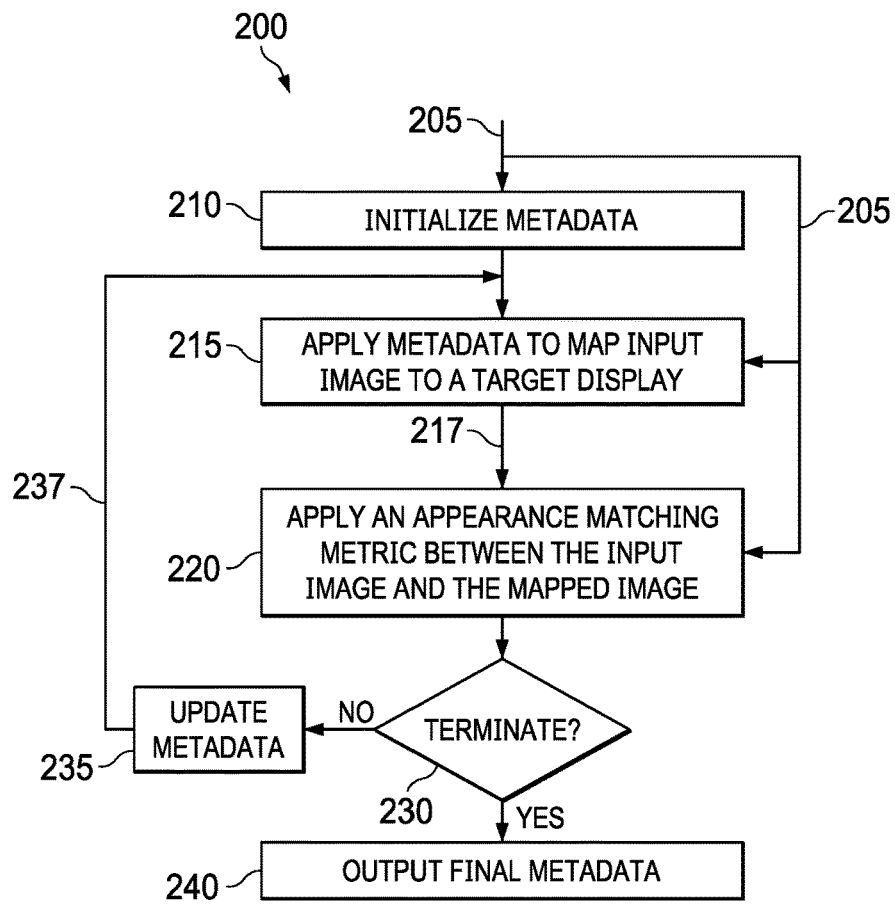
FIG. 2 depicts an example process flow for generating dynamic picture metadata according to an embodiment of this invention.

FIG. 2 depicts an example process (200) for generating dynamic picture metadata according to an embodiment. As depicted in FIG. 2, given an input image or a sequence of images 205, step 210 generates an initial set of metadata based on known manual, automatic, or semi-automatic metadata generation techniques. Next, in step 215, given a target display, the input image (205), and associated metadata (e.g., the initial metadata from step 210 or updated metadata (237) from step 235), a display management process, preferably similar to the one to be used by downstream decoders, is applied to the input image to generate a mapped image (217). Next, in step 220, the original image (205) and the mapped image (217) are compared using an appropriate appearance-matching metric or a visual-difference quality metric. The objective here is to simulate how the original and the mapped images compare to each other according to a simulated human observer. Typically, the smaller the error returned by the metric, the smaller the predicted visual differences, and the better the match. Without limitation, examples of such visual quality metrics include the video multimethod assessment fusion metric (VMAF) (Ref. [6]), the structural similarity index measure (SSIM) (Ref. [7]), and the HDR visual-difference-predictor (HDR-VDP) (Ref. [8]).

Since the two images being compared may have different color volumes (e.g., dynamic range and color gamut), as well as different resolutions or frame rates, suitable image quality metrics should be able to predict an appearance match between the two images regardless of these differences.

In step 230, a decision needs to be made whether the iterative process needs to terminate. For example, the process may terminate if the matching difference is below a certain threshold or if a maximum amount of time or iterations have been reached. If a termination decision is made, then the final metadata is outputted (240), otherwise, updated metadata (237) may be generated in step 235.

Given a specific image quality metric, the metadata updating step (237) may be implemented using any known optimization techniques, such as gradient descent, the Levenberg-Marquardt algorithm, and the like. Applying a metadata optimization method to the dynamic image metadata to reduce the visibility difference value and generate updated image metadata means that the dynamic image metadata is replaced by updated image metadata which has a reduced visibility difference value. Identifying updated metadata which reduces the visibility difference value is a metadata optimization method. The visibility difference value is generated by comparing the input image and a mapped image using an appearance matching metric.

In an embodiment, for some metadata types (such as L2), different metadata may be calculated for a variety of target displays. In such a scenario, the process described above can be duplicated for each target display and bitstreams targeting different display environments may incorporate different set of metadata.

In another embodiment, the mapped image (217) may be further processed by additional modeling operations of the target display, including power limiting operations, global dimming, image enhancement, and the like, to produce a modified-mapped image which may then be used in the comparison step with the input image (step 220) in lieu of the mapped image (217). This process results in metadata that take into consideration specific display operations in the target display that are not part of the display management process alone.

In another embodiment, the generated mapped image (217) may be rendered on a display device (e.g., the target display). The image shown on the display device may then be captured by a calibrated digital camera to produce a calibrated captured image, which may then be used in the comparison step with the input image (step 220) in lieu of the mapped image (217). This process results in metadata that is optimized to preserve the appearance between the reference display and display characteristics of the target display which may be very hard to emulate otherwise with either the display management process alone or a modified-mapped image.

In another embodiment the output is transmitted over a network to a secondary system which is external to a primary system, the primary system being used to generate the output. The secondary system may comprise a display on which an image is rendered using the input image and the dynamic image metadata. The display of the secondary system may have the same or different display characteristics compared to the target display. A possible advantage of providing the input image and the dynamic image metadata as output is that this output can be sent to a wide range of displays. Depending on the actual display, the decoder can then decide how to apply the optimized metadata to the input image.

Each of these references is incorporated herein by reference in its entirety.

References

[1] "*Mastering display color volume metadata supporting high luminance and wide color gamut images*," SMPTE ST 2086:2014, The Society of Motion Picture and Television Engineers, 2014

[2] A.K.A. Choudhury, et al., "*Tone curve optimization method and associated video*," PCT Application, PCT/US2018/049585, filed on Sep. 05, 2018, published as WO2019/050972 (Mar. 14, 2019).

[3] R. Atkins, "*Display management for high dynamic range video*," U.S. Pat. No. 9,961,237.

[4] J.A. Pytlarz, et al., "*Ambient light-adaptive display management*," U.S Patent Application Publication 2019/0304379, Oct. 3, 2019.

[5] R. Atkins, et al., "*Display management for high dynamic range images*," PCT Application PCT/US2020/028552, filed on Apr. 16, 2020.

[6] R. Rassool, "*VMAF reproducibility: Validating a perceptual practical video quality metric*." 2017 IEEE international symposium on broadband multimedia systems and broadcasting (BMSB). IEEE, 2017.

[7] Z. Wang, et al. "*Image quality assessment: from error visibility to structural similarity*," IEEE transactions on image processing 13.4 (2004): 600-612.

[8] R. Mantiuk, et al. "*HDR-VDP-2: A calibrated visual metric for visibility and quality predictions in all luminance conditions.*" ACM Transactions on graphics (TOG) 30.4 (2011): 1-14.

EXAMPLE COMPUTER SYSTEM IMPLEMENTATION

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to generating dynamic picture metadata, such as those described herein. The computer and/or IC may compute any of a variety of parameters or values that relate to generating dynamic picture metadata described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to generating dynamic picture metadata as described above by executing software instructions in a program memory accessible to the processors. The invention may also be provided in the form of a program product. The program product may comprise any tangible and non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to generating dynamic picture metadata are thus described. In the foregoing specification, embodiments of the present invention have been described with reference to numerous specific details that may vary from implementation to implementation. Thus, the sole and exclusive indicator of what is the invention and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

1. A method to generate dynamic picture metadata with a processor, the method comprising:
   receiving an input image in a first dynamic range and dynamic image metadata, wherein the input image is mastered on a mastering display;
   a) applying a display mapping process to map the input image to a mapped image in a second dynamic range, wherein the display mapping process takes into account the dynamic image metadata and display characteristics of a target display different than the mastering display;
   b) comparing the input image and the mapped image using an appearance matching metric to generate a visibility difference value; and if the visibility difference value is larger than a threshold, then:
   c) applying a metadata optimization method to the dynamic image metadata to reduce the visibility difference value and generate updated image metadata;
   d) replacing the dynamic image metadata with the updated image metadata; and
   returning to step a for another metadata updating iteration until a termination criterion;
   else generating an output comprising the input image and the dynamic image metadata.
2. The method of EEE 1, wherein the first dynamic range is a high dynamic range and the second dynamic range is a standard dynamic range.
3. The method of EEE 1 or 2 where the termination criterion comprises limiting a total number of metadata-updating iterations to be smaller than a maximum iteration count.
4. The method of any one of the EEEs 1-3, wherein the appearance matching metric comprises one of the video multimethod assessment fusion metric (VMAF), the structural similarity index measure (SSIM), and the HDR-visual difference predictor (HDR-VDP).
5. The method of any of the preceding EEEs, wherein the metadata optimization method comprises one of a gradient-descent method or the Levenberg-Marquardt algorithm.
6. The method of any of the preceding EEEs, wherein the dynamic image metadata for the input image comprises metadata parameters based on statistics of pixel values in the input image.
7. The method of any of the EEEs 1 to 5, wherein the dynamic image metadata for the input image comprises adjusted metadata parameters computed while observing the input image on the target display.
8. The method of any of the preceding EEEs, further comprising: after step a, applying additional modeling operations for the target display to the mapped image to generate a modified-mapped image; and in step b, comparing the input image and the modified-mapped image using the appearance matching metric to generate the visibility difference value.

9. The method of EEE 8, wherein the additional modeling operations comprise power-limiting, global dimming, or image enhancement operations for the target display.

10. The method of any of the EEEs 1 to 7, further comprising:
after step a, rendering the mapped image on the target display to generate a rendered image and capturing the rendered image with a camera to generate a captured image; and in step b,
comparing the input image and the captured image using the appearance matching metric to generate the visibility difference value.

11. An apparatus comprising a processor and configured to perform any one of the methods recited in EEEs 1-10.

12. A non-transitory computer-readable storage medium having stored thereon computer-executable instruction for executing a method with one or more processors in accordance with any one of the EEEs 1-10.

The invention claimed is:

1. A method to generate dynamic picture metadata with a processor, the method comprising:
receiving an input image in a first dynamic range and dynamic image metadata, wherein the input image is mastered on a mastering display;
a) applying a display mapping process to map the input image to a mapped image in a second dynamic range, wherein the display mapping process takes into account the dynamic image metadata and display characteristics of a target display different than the mastering display;
b) comparing the input image and the mapped image using an appearance matching metric to generate a visibility difference value; and
if the visibility difference value is larger than a threshold, then:
c) applying a metadata optimization method to the dynamic image metadata to reduce the visibility difference value and generate updated image metadata;
d) replacing the dynamic image metadata with the updated image metadata; and
returning to step a for another metadata updating iteration until a termination criterion;
else generating an output comprising the input image and the dynamic image metadata.

2. The method of claim 1, wherein the output is transmitted over a network to a secondary system which is external to a primary system, the primary system being used to generate the output.

3. The method of claim 2, wherein the secondary system comprises a display on which an image is rendered using the input image and the dynamic image metadata.

4. The method of claim 3, wherein the display of the secondary system has the same or different display characteristics compared to the target display.

5. The method of claim 1, wherein the first dynamic range is a high dynamic range and the second dynamic range is a standard dynamic range.

6. The method of claim 1, where the termination criterion comprises limiting a total number of metadata-updating iterations to be smaller than a maximum iteration count.

7. The method of claim 1, wherein the appearance matching metric comprises one of the video multimethod assessment fusion metric (VMAF), the structural similarity index measure (SSIM), and the HDR-visual difference predictor (HDR-VDP).

8. The method of claim 1, wherein the metadata optimization method comprises one of a gradient-descent method or the Levenberg-Marquardt algorithm.

9. The method of claim 1, wherein the dynamic image metadata for the input image comprises metadata parameters based on statistics of pixel values in the input image.

10. The method of claim 1, wherein the dynamic image metadata for the input image comprises adjusted metadata parameters computed while observing the input image on the target display.

11. The method of claim 1, further comprising:
after step a, applying additional modeling operations for the target display to the mapped image to generate a modified-mapped image; and in step b,
comparing the input image and the modified-mapped image using the appearance matching metric to generate the visibility difference value.

12. The method of claim 11, wherein the additional modeling operations comprise power-limiting, global dimming, or image enhancement operations for the target display.

13. The method of claim 1, further comprising:
after step a, rendering the mapped image on the target display to generate a rendered image and capturing the rendered image with a camera to generate a captured image; and in step b;
comparing the input image and the captured image using the appearance matching metric to generate the visibility difference value.

14. An apparatus comprising a processor and configured to perform the method recited in claim 1.

15. A non-transitory computer-readable storage medium having stored thereon computer-executable instructions for executing a method with one or more processors in accordance with claim 1.

* * * * *